(12) United States Patent
Levinas

(10) Patent No.: US 6,424,511 B1
(45) Date of Patent: Jul. 23, 2002

(54) AUTOMOTIVE BATTERY DISCONNECT DEVICE

(75) Inventor: Aharon Y. Levinas, Fair Lawn, NJ (US)

(73) Assignee: Purisys, Inc.

( * ) Notice: Subject to any disclaimer, the term of this patent is extended or adjusted under 35 U.S.C. 154(b) by 0 days.

(21) Appl. No.: 09/481,669

(22) Filed: Jan. 12, 2000

(51) Int. Cl.7 ................................................ H02H 3/00
(52) U.S. Cl. ............................ 361/88; 361/86; 361/90; 361/92
(58) Field of Search .................... 361/86, 91.1, 90, 361/92, 160, 170, 187, 88; 307/10.7; 340/363, 660, 662, 663

(56) References Cited

U.S. PATENT DOCUMENTS

| | | | | |
|---|---|---|---|---|
| 3,395,288 A | * | 7/1968 | Brimer | 307/10.7 |
| 3,460,081 A | * | 8/1969 | Tillman | 335/234 |
| 3,683,239 A | * | 8/1972 | Sturman | 361/194 |
| 4,039,903 A | * | 8/1977 | Russell | 361/187 |
| 4,299,252 A | * | 11/1981 | Reinicke | 137/625.5 |
| 4,410,775 A | * | 10/1983 | Howard | 335/18 |
| 4,493,001 A | * | 1/1985 | Sheldrake | 361/92 |
| 5,173,673 A | * | 12/1992 | Weigand et al. | 335/18 |
| 5,200,877 A | * | 4/1993 | Betton et al. | 361/92 |
| 5,272,380 A | * | 12/1993 | Clokie | 307/10.7 |
| 5,729,192 A | * | 3/1998 | Badger | 340/426 |

* cited by examiner

Primary Examiner—Stephen W. Jackson
(74) Attorney, Agent, or Firm—Gottlieb Rackman & Reisman, P.C.

(57) ABSTRACT

A battery disconnect device includes a housing with a trip/sense circuit, a sealed solenoid and two bars. The solenoid includes a spring loaded contactor disposed in a sealed chamber which normally bridges the bars and is constructed to provide a very low resistivity between the bars. When a coil of the solenoid is activated, in response, for example, to a low battery voltage, the contactor moves away from the bars and is kept in an open position by a magnet. The contactor can be closed or returned to the original position by a manual push button or by a close circuit operated from a remote switch. Additionally the contactor may be opened by using a remote button to act as an anti-theft device.

18 Claims, 4 Drawing Sheets

AUTOMOTIVE BATTERY DISCONNECT DEVICE

BACKGROUND OF THE INVENTION

A. Field of Invention

This invention pertains to a device which can be installed in a motor vehicle such as an automobile, a truck or a sports utility vehicle. More particularly, the subject invention pertains to a device which automatically disconnects the battery of motor vehicle and selectively reconnects the same on demand.

B. Description of the Prior Art

A critical part of any automotive vehicle is its battery which provides power for various primary and secondary systems. Normally an automotive battery can last for a relatively long time since its charge is refreshed continuously as the vehicle is operated. However, in some instances, such as for example, when a short occurs in the vehicle wiring, or a control switch malfunctions, a leakage current may flow even when the engine is off, discharging the battery.

In order to protect the battery from such an occurrence, several proposals have been made for devices that can interrupt undeniable leakage current flow. However, the devices proposed so far have disadvantageous features which makes them undesirable. One such feature is that they interpose a relatively high series resistance between the battery and the car wiring. Therefore a high IR drop is developed, especially at high current drains, thereby reducing the voltage that is available to the vehicle systems, wasting energy, and generating undesirable heat.

A further disadvantage of the proposed devices is that they may not stand up to the extremely hostile environment existing under the hood of motor vehicles. This environment is characterized by high temperatures as well as corrosive fumes which damage sensitive electronic circuitry.

OBJECTIVES AND SUMMARY OF THE INVENTION

In view of the above, it is an objective of the present invention to provide a battery disconnect device with a very low in line resistivity.

A further objective is to provide a device in which the moving parts are sealed in a water and air tight chamber so that they are protected from noxious fumes and other undesirable fluids.

Other objectives and advantages of the invention shall become apparent from the following description.

Briefly, a battery disconnect device for an automotive vehicle includes a sense/trip circuit that sense a preselected condition of a motor vehicle battery; connecting elements such as bars connecting said battery to the vehicular equipment; and a solenoid having a coil and a contactor disposed within a closed chamber and associated with said coil. The coil is activated when an abnormal condition is sensed. The contactor has a first position in which said contactor connects said connecting elements, a second position in which said contactor is removed from said connecting elements. A biasing spring is arranged to urge said contactor toward said first position to generate a force between said contactor and said connecting elements to reduce the in-line device resistivity. A magnet is also provided within the solenoid to keep the contactor in the second position, once the coil has been activated, said second position thereby being maintained even after the coil has been deactivated. A manual push button is used to move the contactor away from the first position until it snaps back to the first position.

Additional elements are used to provide other advantageous features. One such element is a remote trip circuit which allows the solenoid to be tripped remotely thereby allowing the device to be used as an antitheft device. In addition to the pushbutton, a remote close circuit may also be used to close the solenoid. The remote close circuit and/or the remote trip circuit could be activated by a portable transmitter.

The device may further include an indicator for showing when the battery is overcharged, as well as a shunt circuit to allow a trickle current to flow between the battery and the motor vehicle bus for powering certain equipment in the car.

DETAILED DESCRIPTION OF THE INVENTION

Figure 1:
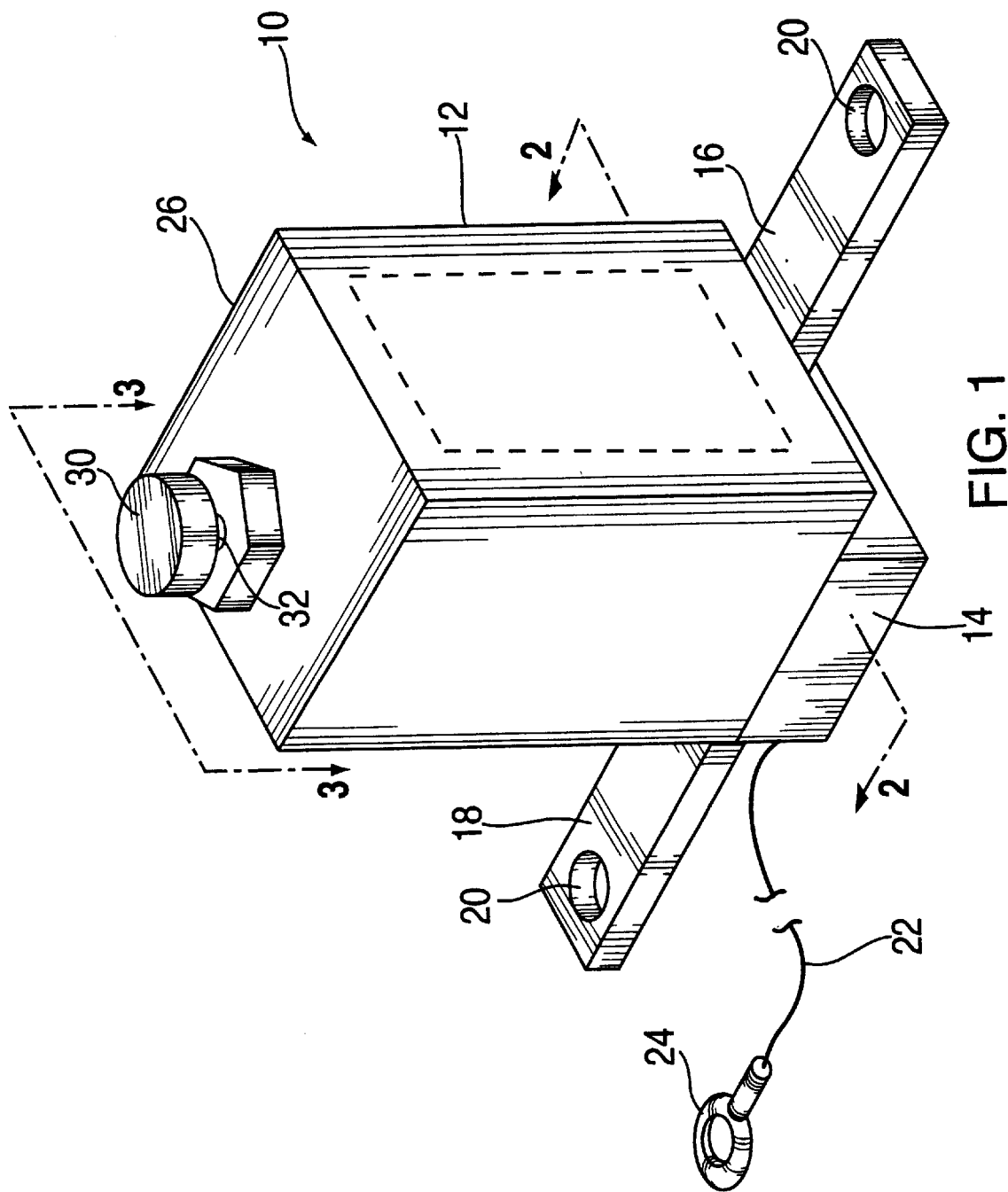
FIG. 1 shows an orthogonal view of a battery disconnect device constructed in accordance with this invention.

Referring now to FIG. 1, a battery disconnect device 10 constructed in accordance with this invention includes a housing 12 with a base 14, an input bar 16 and an output bar 18. Each bar is provided with a corresponding hole 20 for connecting the positive cable device 10 between the battery and of a motor vehicle. Also attached to the housing 12 is a grounding lead 22 terminating with an eyelet 24. The eyelet 24 is connected to the engine block (not shown) or other negative terminal. Housing 12 further includes a non-conductive shell 26 attached to the base 14 and forming a cavity for the various additional elements of the device 10. A pushbutton 28 extends outwardly of shell 26 on a shaft 30.

Figure 2:
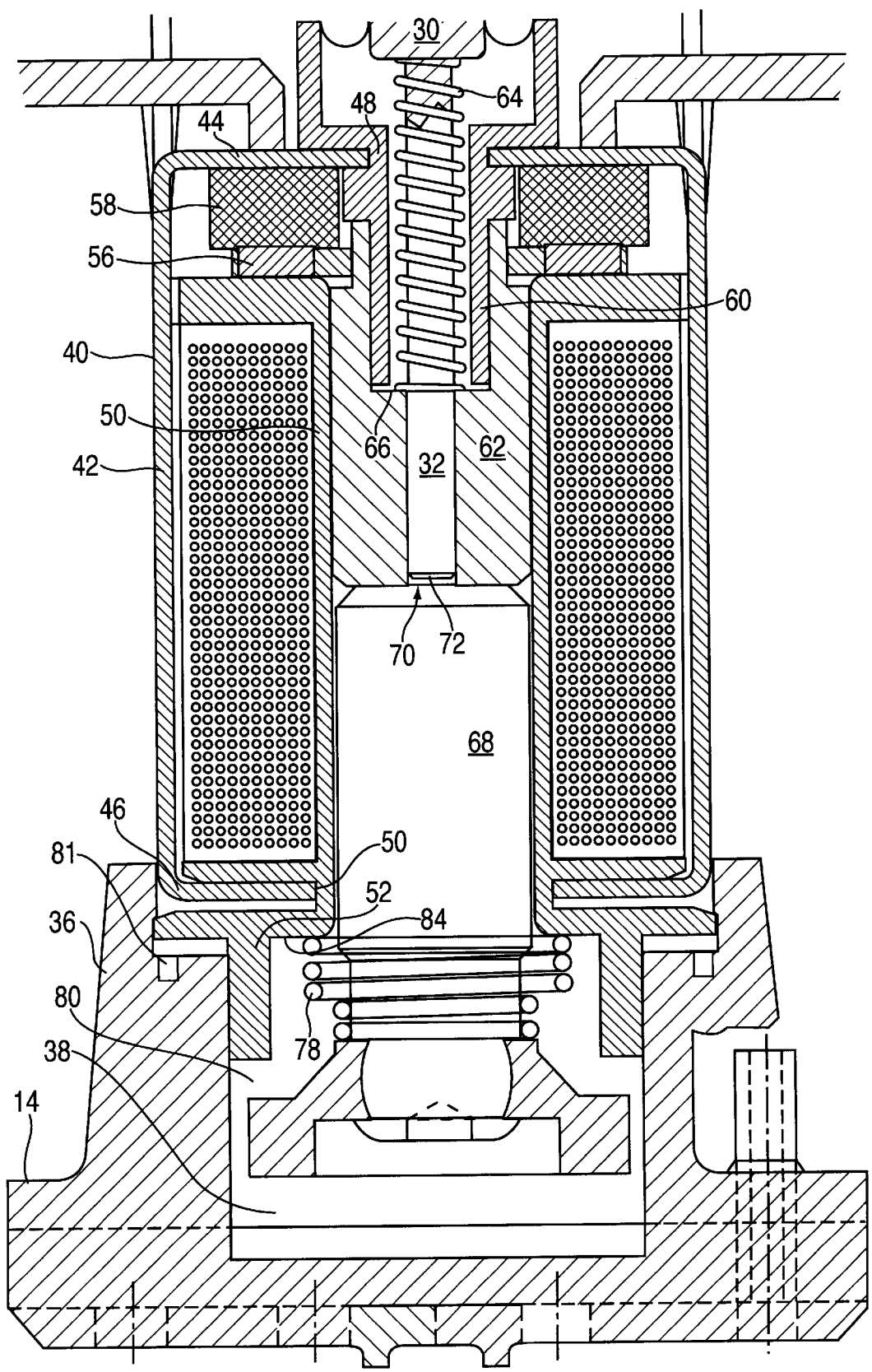
FIG. 2 shows a cross-sectional view of the connecting/disconnecting solenoid of the device of FIG. 1.
Figure 3:
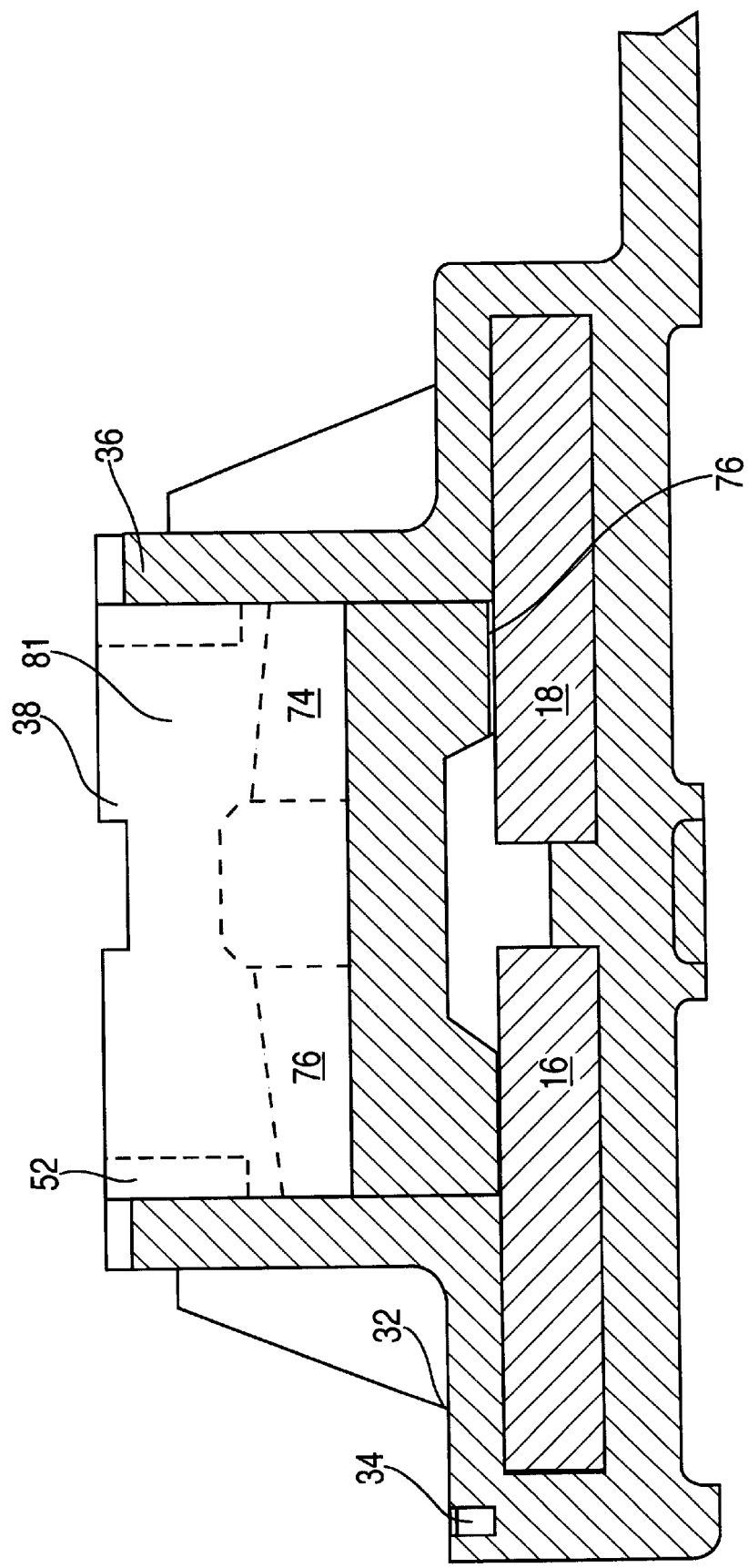
FIG. 3 shows a somewhat enlarged cross-sectional view of the solenoid of FIG. 2 open or disconnected position.

Referring now to FIGS. 2 and 3, base 14 is made of a plastic non-conductive material and the two bars 16, 18 are imbedded in the base in a manner which keeps them apart at distance of about ¼" as shown. The bars 16 and 18 are preferably made of copper or a copper alloy and are coated with a silver layer (not shown) at least on their top surface.

Base 14 has a top surface 32 with a circumferential groove 34. When shell 26 is inserted over the base 14, its lower edge fits into groove 34. The groove 34 may be provided with a potting material or another similar insulating substance which renders the device 10 substantially air and water tight. On top surface 32, the base 14 is formed with an integral member 36 defining a cylindrical opening 38.

Referring now to FIG. 2, inside shell 26 there is provided a solenoid 40. The solenoid 40 includes a tubular case 42 with two end walls 44, 46 formed with respective circular openings 48, 50. The case 42 also has longitudinal openings which have been omitted for the sake of simplicity. Inside the case 42 there is a bobbin 50 made of a plastic material. This bobbin 50 has at one end a toroidal extension 52 arranged and constructed to fit into cylindrical opening 38 of member 30 as shown. A standard solenoid coil 54 is wound on the bobbin 50.

Above the bobbin 50 there is a circular washer 56. A permanent annular magnet 58 is disposed between washer 56 and end 44 of case 42.

A plastic sleeve 60 and a metallic sleeve 62 extend axially through the shell 26, opening 44 and bobbin 50.

Pushbutton 30 is seated at the top end of the sleeve 60 with its shaft 32 extending through the sleeves 60 and 62 and terminating near the bottom wall 72 of sleeve 62 as shown. A spring 64 rests between the pushbutton 30 and a shoulder 66 on sleeve 62 and is used to bias the pushbutton upward.

A metallic rod 68 extends downwardly from the sleeve 62 and is slidable within the bobbin 50.

The rod 68 has a top surface 70 which, when the rod 68 is in topmost position shown in FIG. 3, is adjacent to surface 72 of sleeve 62.

At the end of rod 68 opposite surface 70, a ring 74 is rotatably mounted on rod 68 so that it can spin around the longitudinal axis of the rod 70. The ring 74 has a diameter which is much larger than the distance between the bars 16 and 18. For example, the ring 74 can have a diameter equal to the widths of the bars 16 and 18. Preferably ring 74 is made of silver, a silver alloy or other highly conductive material. Moreover, the ring 74 has a bottom annular surface 76 which is highly polished. A spring 78 is disposed between the ring 74 and a shoulder 80 formed on bobbin 50. This spring 78 is used to bias ring 74 downwardly.

Rod 68 and sleeve 62 are made of a ferromagnetic material.

As seen clearly in FIGS. 2 and 3, the bobbin portion 52 and member 36 cooperate to form a closed tubular space 81 for ring 74. In fact a sealant may be applied between these members to insure that the space 80 remains airtight and free of dirt, exhaust gases and other impurities. As the rod 68 slides longitudinal, the ring 74 reciprocates in this space 81. Rod 68 and ring 74 collectively define a contactor for the solenoid 40 which contactor can be shifted from a closed position where the bars 16, 18 are electrically connected by ring 74 (shown in FIG. 3) where the bars 16, 18 are not connected electrically because the right 74 is spaced away therefrom.

Figure 4:
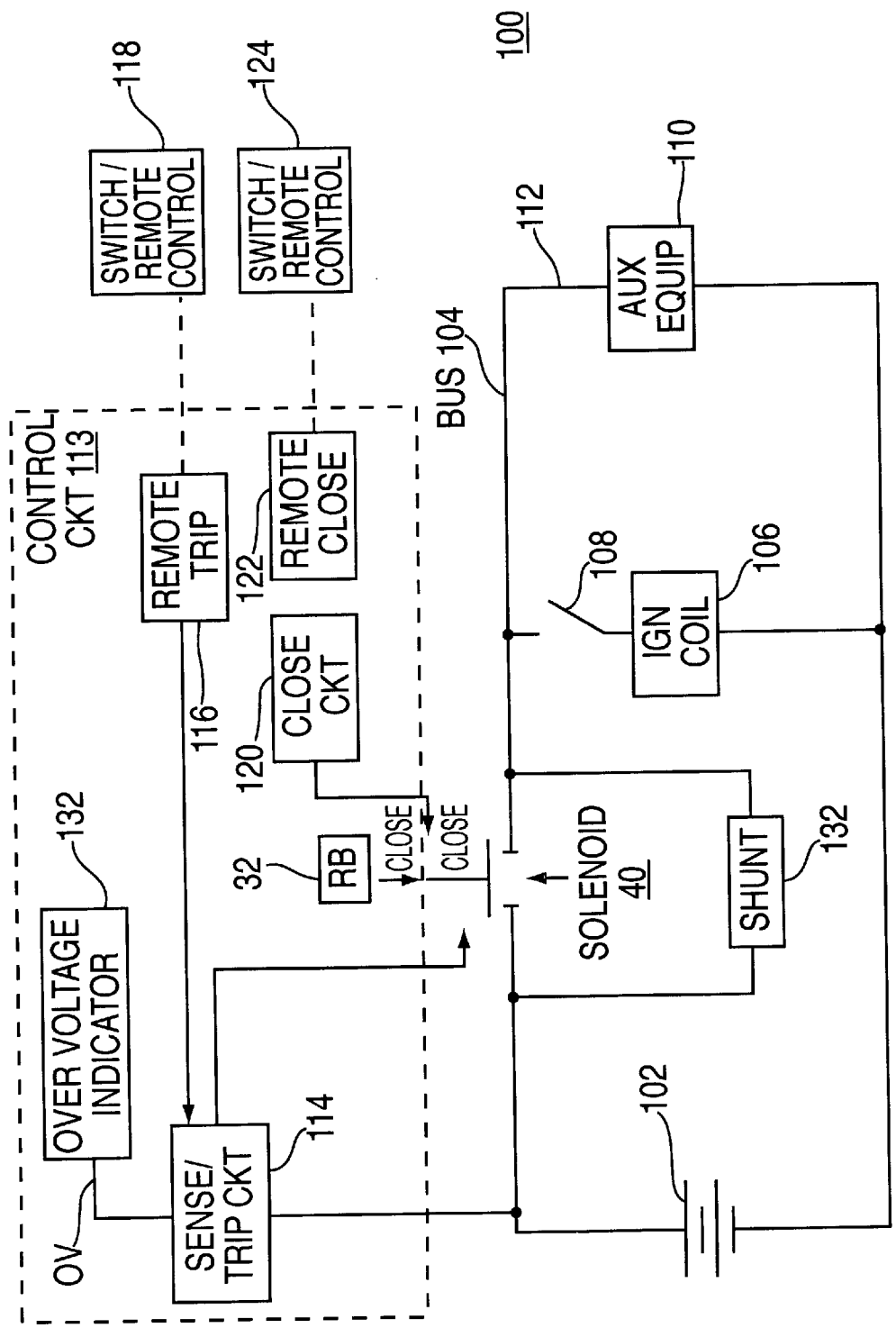
FIG. 4 shows a block diagram for the control system used to operate the subject disconnect device.

Referring now to FIG. 4, typically the electrical circuitry 100 of an automotive vehicle includes a rechargeable battery 102 (the re-charger has been omitted for the sake of clarity) which feeds a battery bus 104. An ignition coil 106 is selectively energized by bus 104 through a switch 108. Various other auxiliary equipment collectively identified by numeral 110 are selectively energized by a respective switch 113. Importantly, bus 104 is selectively connected to battery 102 by solenoid 40 in response to commands from a control circuit 113. The control circuit 113 is physically mounted in housing 12 on a standard PC board (not shown).

In the simplest embodiment of the invention, the control circuit 113 includes a sense/trip circuit 114. This circuit 114 senses the battery voltage and/or monitors current flowing from the battery and is used to sense an abnormal condition. For example, if switch 112 is defective, it may remain turned on and maintain some current through the auxiliary equipment 110 even after the engine is turned off. If the driver leaves the vehicle and is not aware of this problem, after some time, the current through the auxiliary equipment 110 drains the battery 102 sufficiently so that when the driver returns he will not be able to start his engine. This situation is avoided by the present invention because, the sense/trip circuit 114 senses that the battery is depleted before a critical voltage level is reached and causes the solenoid 40 to open thereby avoiding further discharge of the battery 102. Alternatively, the circuit may sense current flow from the battery 102 while the engine is off.

Referring back to FIGS. 2 and 3, initially, i.e. under normal operating conditions, the coil 54 is de-energized, the rod 68 and attached ring 74 are in their low position in which the top surface 72 of the rod 68 is longitudinally spaced from the sleeve 62 and the ring 74 is pressed downwardly by spring 78 so that its surface 76 is in intimate contact with the top surfaces of the bars 16, 18. The rod 68 and ring 74 are maintained in this position by spring 78. Because of the high polish of the contacting surface 76 of the ring 74 and bars 16 and 18 as well as the biasing force of spring 78, the resistivity between the bars 16 and 18, i.e., the in line resistance between battery 102 and bus 104 is extremely low. The voltage drop across the bars in device constructed in accordance with this invention has been measured to be less than 0.02 volts at 200 amps. Therefore, the solenoid 26 presents only a very minimal in line resistivity and has no substantial impact on the voltage of bus 104.

A further advantage of the invention is the ring 74 need not be tightly mounted on rod 70 but can be secured thereto such that it has a slight axial play. Therefore as the ring 74 is pressed against the bars 16, 18, the ring 74 automatically adjusts to imperfections in the surfaces of the bars 16 and 18 as well as imperfections of its own surface 76.

When the sense/trip circuit 114 senses an abnormal condition, (as described above) it energizes coil 54. The coil 54 then induces a magnetic field within bobbin 50 and generates a magnetic force upwardly on rod 68 and ring 74. This force is sufficient to overcome the downward force of spring 78 and to pull rod 68 and ring 74 upward to the open position shown in FIG. 2. In this position, the ring 74 is spaced away from the bars 16 and 18 and hence disconnects bus 104 from the battery 102.

Once the rod 68 is pulled upward into the bobbin 50 to the position shown in FIG. 2, its upper surface comes into contact with the lower surface 72 of sleeve 62. As previously described, sleeve 62 is made of a ferromagnetic material and it is magnetized by its contact to the permanent magnet 58. Therefore, once the rod 68 is in its upper or open position, it touches lower surface 72 and is maintained in this position even after the coil 54 is de-energized by the magnetic attraction of sleeve 62. Hence coil 54 needs to be energized only for a very short time period, i.e., until the rod 68 moves upward. Thereafter, the coil 54 may be de-energized. The energy requested by the coil 54 is very small.

In one embodiment, the solenoid 26 is reset or closed as follows. Pushbutton 30 is biased upwardly out of the shell 26 by spring 64. As seen in FIG. 3, in this configuration, shaft 32 attached to the pushbutton 30 is disposed inside the sleeve 62. In order to close the solenoid 40, the driver or a mechanic pushes the pushbutton 30 downward, thereby forcing the rod 32 to move axially downward through the sleeve 62 and push rod 68 away from the sleeve 62. At a critical point, the downward force of spring 78 exceeds the upward magnetic force on rod 68 and forces the rod 68 to snap downward with the ring 74 bearing against the bars 16 and 18. In this manner the solenoid is closed thereby making contact between battery 102 and bus 104.

Several additional elements may be provided for the device described so far, thereby providing additional features. In one embodiment, a remote trip circuit 116 is provided. This circuit 116 may be activated by a switch 118 hardwired to another part of the vehicle, such as, for example, on the dash board. When the remote control trip device is operated, the trip circuit 114 opens the solenoid 40 in a manner similar to the operation described above. Thus, the device 10 may be used as an anti-theft device since the car will not start until the contact between bars 16, 18 is restored.

Alternatively, the switch 118 may be replaced by a portable remote control transmitter carried by the driver and a receiver in device 10 arranged so that when the transmitter is activated by the driver, the receiver receives a signal from the transmitter and in response sends a signal to the sense/trip device 114 causing the open command to be generated. In this configuration, the remote trip device 118 may be used as a theft deterrent means as well to disable the vehicle when not in use.

Another feature that may be added to the circuitry 100 is an electrical close circuit 120. This electrical close circuit 120 may include another coil disposed within the housing of device 10 and arranged so that when it is activated, it pulls rod 70 away from sleeve 62 and cause it to snap to the closed position. Electrical close circuit 120 may be activated by a manual pushbutton on housing 12, not shown, or may be activated by a remote close circuit 122. Once again circuit 122 may be activated by a switch 124 disposed on the dash board and hard wired to the circuit 122. Alternatively the switch 124 may be replaced by a portable transmitter which may activate circuit 122 to close the solenoid 40.

Since the sense/trip circuit monitors the condition of the battery 102 anyway, it may also be used to detect an overcharge condition. If, for example, the sense/trip circuit 114 detects when the voltage of battery 102 is over a predetermined value, such as 13.8V, the sense/trip circuit generates an over voltage signal OV. This signal OV is used to drive an over voltage indication 132. This indicator 132 may be disposed on the housing 12, or it may be disposed remotely, for example on the dash board.

If a remote trip circuit 116 as well as a remote close circuit 122 are provided simultaneously then a single portable transmitter may be used selectively to activate both circuits.

The circuitry 100 may be also provided with a shunt circuit 130. This circuit 130 is designed to allow a current of a predetermined value (which is relatively low as compared for example to the current used during ignition). This circuit 130 may be used to allow some of the auxiliary equipment 108 to get power from the bus 104 even if the solenoid is open, as long as this equipment does not draw too much current. The various circuits used to control the operation of the subject solenoid can be implemented by using a microprocessor to reduce power requests and size.

Obviously numerous modification may be made to the invention without departing from its scope as defined in the appended claims.

I claim:

1. A battery disconnect device for an automotive vehicle comprising:
    a sense/trip circuit that sense a preselected condition of a motor vehicle battery;
    connecting elements connecting said battery to vehicular equipment; and
    a solenoid having a coil activated by said sense/trip circuit when said preselected condition is sensed, a contactor associated with said coil and having a first position in which said contactor connects said connecting elements, a second position in which said contactor is removed and a biasing spring arranged to urge said contactor toward said first position and to generate a force between said contactor and said connecting elements to reduce a resistivity between said connecting elements;
    wherein said sense/trip circuit is constructed to sense a low voltage condition of said battery and to switch said contactor from said first to said second condition in response to said low voltage condition, and wherein said sense/trip circuit further senses a high voltage condition and generates a high voltage indication signal.

2. The device if claim 1 wherein said contacting elements have contacting surfaces and said contactor has a facing surface facing said contacting surfaces, said facing surface and contacting surfaces being polished to form a smooth contacting interface there between.

3. The device of claim 2 wherein said surfaces are silver plated.

4. The device of claim 1 wherein said contactor is disposed in a chamber, said chamber being sealed for protection.

5. The device of claim 1 wherein said solenoid further comprises a magnet arranged to maintain said contactor in said second position after an activation of said coil.

6. The device of claim 5 further comprising a closing element that selectively switches said contactor from second to said first position after to said coil is deactivated.

7. The device of claim 6 wherein said closing element cooperates with said spring to allow said contactor to snap to said second position after said contactor has been displaced by a predetermined distance from said first position.

8. The device of claim 6 wherein said closing element is a manual switch arranged to push said contactor away from said second position toward said first position.

9. The device of claim 6 wherein said closing element includes a closing coil arranged to urge said contactor away from said second position when said closing coil is activated and a closing member for selectively activating said closing coil.

10. The device of claim 9 wherein said closing element includes a portable transmitter coupled to said closing coil to selectively activate said closing coil.

11. The device of claim 1 further comprising a remote trip element constructed to selectively switch said contactor from said first to said second position.

12. The device of claim 11 wherein said remote trip element includes a portable transmitter device transmitting a trip command, said solenoid receiving said trip command and switching said contactor from said first to said second position.

13. The device of claim 1 further comprising an overcharge indicator receiving said high voltage condition and generating an over voltage signal in response.

14. A disconnect device for disconnecting a battery comprising:
    a sealed housing with a first and a second bar extending from said housing;
    a solenoid disposed in said housing and including a coil selectively activated, said coil cooperating with said housing to define a chamber space between said coil and said first and second bars;
    a spring loaded contactor arranged to selectively reciprocate within said chamber space between a first position in which said contactor electrically bridges said first and second bar, and a second position in which said contactor is away from said bars; and
    a sense/trip circuit is constructed to sense a low voltage condition of said battery and to switch said contactor from said first to said second position in response to said low voltage condition, and wherein said sense/trip circuit further senses a high voltage condition and generates a high voltage indication signal.

15. The device of claim 14 wherein said solenoid further includes a magnet disposed at one end of said coil and said chamber space is disposed at a second end of said coil, said magnet being positioned to hold said contactor in said second position.

16. The device of claim 15 further comprising a close button which can be activated to mechanically move said contactor from said second to said first position.

17. The device of claim 15 wherein said contactor includes a rod aligned axially with said coil within said chamber and a ring having a smooth surface and attached to said rod to contact said bars when said contactor is in said first position.

18. The battery disconnect device of claim 1 wherein said solenoid, said contactor and said spring cooperate to position said contactor in said first position when said solenoid is de-energized and in said second position when said coil is energized.

* * * * *